(12) United States Patent
Hashimura

(10) Patent No.: US 7,874,600 B2
(45) Date of Patent: Jan. 25, 2011

(54) BUMPER SYSTEM FOR VEHICLE

(75) Inventor: Toru Hashimura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/110,881

(22) Filed: Apr. 28, 2008

(65) Prior Publication Data

US 2009/0267368 A1 Oct. 29, 2009

(51) Int. Cl.
*B60R 19/02* (2006.01)

(52) U.S. Cl. ................ 293/102; 293/155; 296/187.04

(58) Field of Classification Search ............ 293/102, 293/120, 121, 122, 155; 296/187.04
See application file for complete search history.

(56) References Cited

U.S. PATENT DOCUMENTS

| 3,690,710 | A | * | 9/1972 | Curran et al. | ............ 293/110 |
| 6,846,026 | B2 | | 1/2005 | Detwiler et al. | |
| 7,422,252 | B2 | * | 9/2008 | Gouillart et al. | ............ 293/102 |

2008/0012364 A1 * 1/2008 Boggess ............... 293/120

FOREIGN PATENT DOCUMENTS

| EP | 1199224 | 4/2002 |
| EP | 1318323 | 6/2003 |
| JP | 2003-285704 | 10/2003 |
| JP | 2003-312397 | 11/2003 |
| JP | 2004-90910 | 3/2004 |
| JP | 2004-114864 | 4/2004 |
| WO | WO 2006-012223 | 2/2006 |
| WO | WO 2006-126940 | 11/2006 |

* cited by examiner

*Primary Examiner*—Joseph D Pape
(74) *Attorney, Agent, or Firm*—Oblon, Spivak, McClelland, Maier & Neustadt, L.L.P.

(57) ABSTRACT

The bumper system for a vehicle body includes a vehicle body bumper beam of a hollow construction with an impact buffer member arranged in the front side. The impact buffer member is provided with a collision wall part, side wall parts and joint flanges and is integrally formed by a metallic material, the collision wall part and the side wall parts forming a sectional shape of approximately U-shape which embraces the bumper beam. The joint flanges are joined with the flanges protruding from the rear wall of the bumper beam and support the impact buffer member from the rear wall side of the bumper beam.

6 Claims, 3 Drawing Sheets

BUMPER SYSTEM FOR VEHICLE

BACKGROUND OF THE INVENTION

1. Field of the Invention

The present invention relates to a bumper system for a vehicle excellent in load energy absorbing performance at the time of a vehicle collision, particularly excellent in characteristics mitigating the impact applied to a human body and reducing the damage to a pedestrian at the time of the collision with the pedestrian.

2. Description of the Related Art

On the vehicle body of automobiles and the like, a bumper system reducing the impact load by deforming in the direction of the collision and absorbing the impact energy for ensuring the safety of an occupant and protecting a collided pedestrian's body at the time of the vehicle collision is known.

A representative example of the bumper system is the one constituted of a bumper beam of iron and steel or of an aluminum alloy mounted at the front face of bumper stays, a cushioning material of foamed resin arranged in front of it, and further in front of which, a bumper cover often formed integrally with outer face of the vehicle.

Recently, to achieve the weight reduction of a vehicle, an aluminum alloy extruded hollow shape or the like has begun to be in use for these bumper beams instead of steel. The aluminum alloy bumper beam is formed of a hollow material with the section of a variety of generally rectangular shape extending in the width direction and with an appropriate bend to match the vehicle body external shape. For the iron and steel bumper beam, configuration is almost same with the exception that the hollow material is often an open sectional member.

For these vehicle body bumper systems, functions are required for reducing the impact load and absorbing the impact energy at the time of collision from the front side or the rear side of the vehicle or the collision of the vehicle to the front side or the rear side by the bumper beam supported by the vehicle body and the cushioning material of a foamed material arranged in front of it.

With respect to these impact energy absorbing functions, the protection of the pedestrian at the time of a collision with the pedestrian has also been newly required in addition to collision with a "highly rigid object" such as a vehicle or other objects (guard rail, pole and the like).

For example, the representative examples of the damage to the pedestrian at the time of the collision of the vehicle against the pedestrian are a head, a waist and a leg part, and the European Enhanced Vehicle-safety Committee and etc. are conducting a New Car Assessment Program (NCAP). According to it, a pedestrian protection characteristics assessment test is proposed for each of the head, the waist and the leg part, which is becoming a standard assessment method for protection of the pedestrian by the vehicle. Among these assessment tests, the assessment test method on the leg part, which is the part the bumper system relates to, stipulates a test in which the leg impactor imitating the leg of the pedestrian is made to collide with the bumper system at the speed of 40 km/h. At the time of the collision, the output of various type of sensors (acceleration, shearing deformation quantity, bending angle) provided in the leg impactor is required to be equal to or less than a prescribed value. In particular, the acceleration value should be 150 G or less.

However, the bumper systems disclosed until now were devised under an assumption of the collision with a "highly rigid object" such as a vehicle or other objects (guard rail, pole and the like), therefore most of them were designed under an assumption of the collision with objects of comparatively high rigidity and high strength. Accordingly, with these bumper systems, acceleration, particularly, surpasses the restriction value among the assessment values (acceleration, shearing deformation amount, bending angle) at the time of the collision with the leg model of the pedestrian.

On the contrary, in the bumper systems designed with lowered strength and rigidity in order to protect pedestrians, the functions of reducing the impact load and absorbing the impact energy at the time of collision with the pedestrian's body causes high rigidity and high strength to be deteriorated. As such, the bumper system is required to compatibly satisfy these conflicting functions.

In this regard, although a variety of ideas such as arranging an impact absorbing device or an air bag in front of the bumper beam (bumper reinforcement) are conventionally proposed, they are not yet put to practical use. Therefore, usually (practically), measures of arranging a comparatively thick absorber (cushioning material, an energy absorbing member) such as a urethane foam material or styrene foam material in the location front of the bumper beam and back of the bumper cover have been taken. However, in designing a vehicle body, there is a limit in the thickness of the absorber arranged, and there actually is a limit in the pedestrian protecting performance (impact energy absorbing function) as well.

On the other hand, in addition to the absorber described above, the bumper beam with an impact buffer member for vehicle collision arranged in the front is conventionally proposed. In such a bumper system, the impact buffer member is deformed in the direction of the thickness of the section (cross-sectional direction) at the time of the collision of the vehicle and the impact of the vehicle collision is buffered. With this configuration, the bumper reinforcement material newly adding the function of pedestrian protection can be provided without deteriorating the function of high rigidity and high strength which is the original function of the bumper beam (bumper reinforcement).

For example, in Japanese Unexamined Patent Application Publication (JP-A) No. 2004-114864, an impact buffer member of a hollow structure having an abutment wall positioned apart from the outer end face of a bumper beam by a prescribed distance to receive an impact from the collided pedestrian's body at the time of collision, and support walls extended from installation walls abutted on the bumper beam to support the abutment wall from the back side is proposed. Each of the support walls is constituted to comprise a curved support wall along the installation wall to be curved and extended in a range of a prescribed width continuous with the installation wall. When impact is applied to the abutment wall through the object, the curved support walls are deformed in their curvature direction to be bent.

In JP-A-2003-285704, an impact reduction vehicle bumper system for a vehicle having at least two frame rails mounted on the vehicle body, at least two brackets coupled respectively to the frame rails, a beam attached to the brackets, a plate member attached to the beam, and frame rail extensions coupled to the brackets is proposed.

In JP-A-2003-312397, an energy absorbing member for personal protection is proposed, wherein a shape of bellows-shape is extended in the direction such that the direction of the bellows-shape becomes in parallel with the load of collision from the front, the bellows-shape is deformed at the time of the collision with a pedestrian, and the maximum load during the loaded displacement is decreased, thereby securing the energy absorption amount required for protection of a pedestrian.

In JP-A-2004-90910, an energy absorbing member for personal protection is proposed which consists of a front flange and a rear flange provided approximately in parallel in the longitudinal direction of the vehicle and right and left webs provided approximately in parallel and connecting between these flanges, the respective web consisting of an aluminum alloy hollow shape curved toward outside respectively. With this configuration, at the time of collision with a pedestrian, the respective web is deformed, the entire member is gradually deformed into a flat shape just like the open/close motion of a pantograph of an electric train, the maximum load during the loaded displacement is decreased, and the energy absorption amount required for protection of a pedestrian can be secured.

However, in JP-A-2004-114864, because the impact buffer member is a hollow member made of resin, in order to get enough performance for protecting the pedestrian's leg, the thickness needs to be considerably thick compared with the cushioning material made of a metal, and lightening is sacrificed. Also, in its production, the material and the thickness of resin are restricted and the problem of inferior recycling property compared to the cushioning material made of a metal is involved.

On the other hand, in designing a vehicle body or in the case of a small sized vehicle, the distance (clearance) between the face of the bumper beam (bumper reinforcement) in the side of the vehicle front and the bumper cover becomes narrower, therefore the width of the impact buffer member (energy absorbing member for personal protection) in the longitudinal direction of the vehicle must be made narrower. In this regard, in the impact buffer member as described in JP-A-2003-285704, the length of the plate member in the longitudinal direction of the vehicle becomes comparatively long (the plate member protrudes long in front of the bumper beam) in order to secure the energy absorption amount required for protection of a pedestrian, therefore it cannot be applied to some vehicle designs (vehicle kinds).

Furthermore, in the actual collision, the collision position of a pedestrian differs respectively. Accordingly, it may possibly happen that the collision position of a pedestrian largely shifts from the position where the energy absorbing member is installed. They are, the case where the collision position of a pedestrian's leg is shifted in the direction of vehicle width, the case where the collision direction of a pedestrian leg is shifted in the horizontal direction, or the like. In order to generate the desirable displacement of the cushioning member (energy absorbing member) to cope with these cases, the energy absorbing member for personal protection with a comparatively large area extending over the front face of the bumper reinforcement is required.

When the area of the cushioning member is comparatively enlarged as described above, the weight of the cushioning member constituted in a comparatively thick wall thickness as described in JP-A-2003-312397 and JP-A-2004-90910 is increased and lightening is sacrificed. Also, if the case that the collision direction of a pedestrian's leg is shifted with respect to the up-down direction of the vehicle (vertical direction) is considered, this means a shift of the line of action of the compressing force, in such a cushioning member utilizing the collapse of the shape toward the direction of the thickness of the section. In the cushioning member utilizing the collapse to the direction of the thickness of the section, if the line of action of the compressing force is shifted, the energy absorbing performance becomes liable to be deteriorated. As such, in this type of cushioning member, the thickness of the section is forcibly increased by the shift of the collision position of a pedestrian as well, in order to retain the energy absorbing performance. From this viewpoint, in such a cushioning member, the energy absorption amount required for protection of a pedestrian is hard to be secured.

SUMMARY OF THE INVENTION

Accordingly, the present invention aims at providing the bumper system for a vehicle with the excellent characteristics for protecting the pedestrian's leg, which is light in weight even if its area is comparatively enlarged, and is capable of lowering the generated force, acceleration and the like at the time of collision even if its width in the direction of the thickness of section is narrowed (thinning).

According to one aspect of the present invention that can achieve the purpose described above, the bumper system for a vehicle includes a bumper beam comprising a front wall positioned toward a front side of a vehicle, side walls extending in the longitudinal direction of the vehicle, and a rear wall having flange parts protruding at both ends of the rear wall, whereby a hollow section is enclosed by the front wall, the side walls and the rear wall; and an impact buffer member arranged at a front side of the bumper beam, the impact buffer member comprising a colliding wall part positioned toward the front side of the vehicle, side wall parts extending toward the rear of the vehicle from opposite vertical sides of the colliding wall part, and joint flanges respectively protruding vertically from rearward ends of the side wall parts, wherein the colliding wall part, the side wall parts and the joint flanges are integrally formed, wherein the colliding wall part of the impact buffer member extends vertically at the front side of the bumper beam over the entire height of the front wall of the bumper beam, wherein the side wall parts of the impact buffer member respectively extend toward the rear side of the vehicle along the outside of the side walls of the bumper beam and reach the joint flanges located at the rear wall of the bumper beam, with the side wall parts and the colliding wall part forming a sectional shape surrounding the bumper beam, and wherein the joint flanges of the impact buffer member are joined with the flange parts of the rear wall of the bumper beam.

In the bumper system of the above constitution, the impact buffer member preferably has a thinner thickness than that of the bumper beam.

In the bumper system of the above constitution, the bumper beam is preferably constituted of a hollow extruded shape of an aluminum alloy.

In the bumper system of the above constitution, the impact buffer member preferably is an integrally formed article of the colliding wall part, the side wall parts and the joint flanges formed of an aluminum alloy plate.

In the bumper system of the above constitution, the colliding wall part of the impact buffer member preferably includes a recess to become the starting point of the deformation at the time of the vehicle collision.

In the bumper system for a vehicle in accordance with the present invention, the colliding wall part of the impact buffer member protrudes toward the front side of the bumper beam and extends in the up-down direction of the vehicle over the entire area of the front wall of the bumper beam extending in the up-down direction of the vehicle.

As described above, in the bumper system for a vehicle in accordance with the present invention, the area of the colliding wall part of the impact buffer member is enlarged to extend over the front face of the bumper beam (to enable to cover the entire face of the front wall of the bumper beam). Consequently, the energy absorbing function can be exerted regardless of the colliding position of the pedestrian. Also, the hollow constituted by the front wall of the bumper beam and the colliding wall part can be enlarged and the absorbing and buffering function at the time of the vehicle collision by the deformation of the hollow construction in the longitudinal direction of the vehicle (the direction of the thickness of the section) can be enhanced.

Besides, the side wall parts of the impact buffer member respectively elongate from each of upper and lower ends of the colliding wall part in the up-down direction of the vehicle toward the rear side of the vehicle along the outside of the side walls of the bumper beam extending in the longitudinal direction of the vehicle, reach the rear wall of the bumper beam, with the side wall parts and the colliding wall part forming a sectional shape of approximate U-shape surrounding the bumper beam. Therefore, in this invention, the stroke (length) of both of the side wall parts of the impact buffer member becomes comparatively long and the length of the deformation in the longitudinal direction of the vehicle (direction of the thickness of the section) of both of the side wall parts by the impact at the time of vehicle collision becomes long. As a result, a steep rise of the load in the load-displacement relation (curve) is decreased which can improve the buffering characteristics (pedestrian protecting characteristics) at the time of the collision. Also, a harmful influence is not exerted on the characteristics in the bumper beam side such as strength. Further, it becomes possible to change the energy absorption characteristics and to increase freedom in designing.

Furthermore, the joint flanges of the impact buffer member support the impact buffer member from the side of the rear wall of the bumper beam by respectively protruding in the up-down direction of the vehicle from each end of both of the side wall parts in the rear side of the vehicle and joining with the flanges respectively protruded in the up-down direction of the vehicle from the rear wall of the bumper beam. Such supporting and joining are continuously conducted over the longitudinal direction (vehicle width direction) of the bumper beam and the impact buffer member.

With this arrangement, the joining of the impact buffer member and the bumper beam becomes the joining of flanges to each other, therefore the generally used mechanical joining means such as bolts or rivets and the generally used weld joining means such as spot welding become applicable to increase the number of choices for joining and to simplify the joining itself. With this configuration, the supporting and the joining force of the impact buffer member against the bumper beam is controllable over the longitudinal direction of the impact buffer member. In other words, it is possible to secure the energy absorption amount required for the pedestrian protection and to secure the displacement of the impact buffer member in the longitudinal direction of the vehicle (the direction of the thickness of the section) and to control the reaction force and the acceleration generated at the time of the collision.

Moreover, all of the colliding wall, side walls and joint flanges of the impact buffer member are integrally formed of a comparatively thin metallic material such as a sheet of aluminum alloy plate. Thereby, manufacturing of the impact buffer member becomes easy compared with joining separate members. In addition, there will be no breakage of joining parts by the impact at the time of the vehicle collision, to allow an improved energy absorbing function at the time of the collision.

Consequently, the bumper system for a vehicle of the present invention can lower the generated load, the acceleration, or the like at the time of the collision and can secure the characteristics required for pedestrian protection even in the case that the width of the impact buffer member is comparatively narrowed (thinning).

DETAILED DESCRIPTION OF THE PREFERRED EMBODIMENTS

Embodiments of the present invention will be described below with reference to the accompanying drawings.

Figure 1:
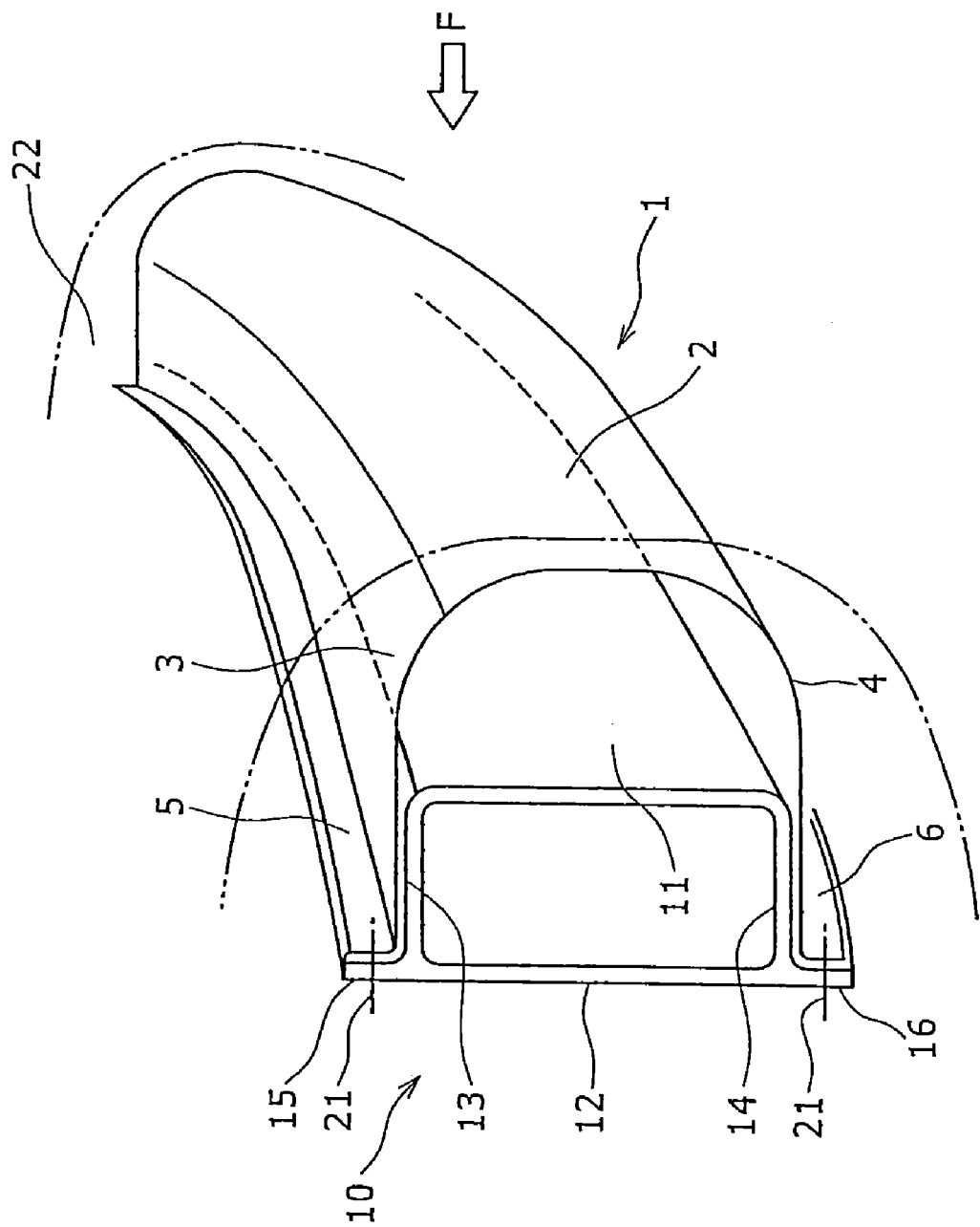
FIG. 1 is an oblique perspective view showing an embodiment of the bumper system for a vehicle in accordance with the present invention.

FIG. 1 shows an embodiment of the bumper system for a vehicle of the present invention arranged at the front side or the rear side of the vehicle and is an oblique perspective view showing the embodiment wherein the impact buffer member made of a metal is attached in front of the bumper beam. Likewise, FIG. 2 is an oblique perspective view showing another embodiment wherein only the impact buffer member attached is different.

Figure 2:
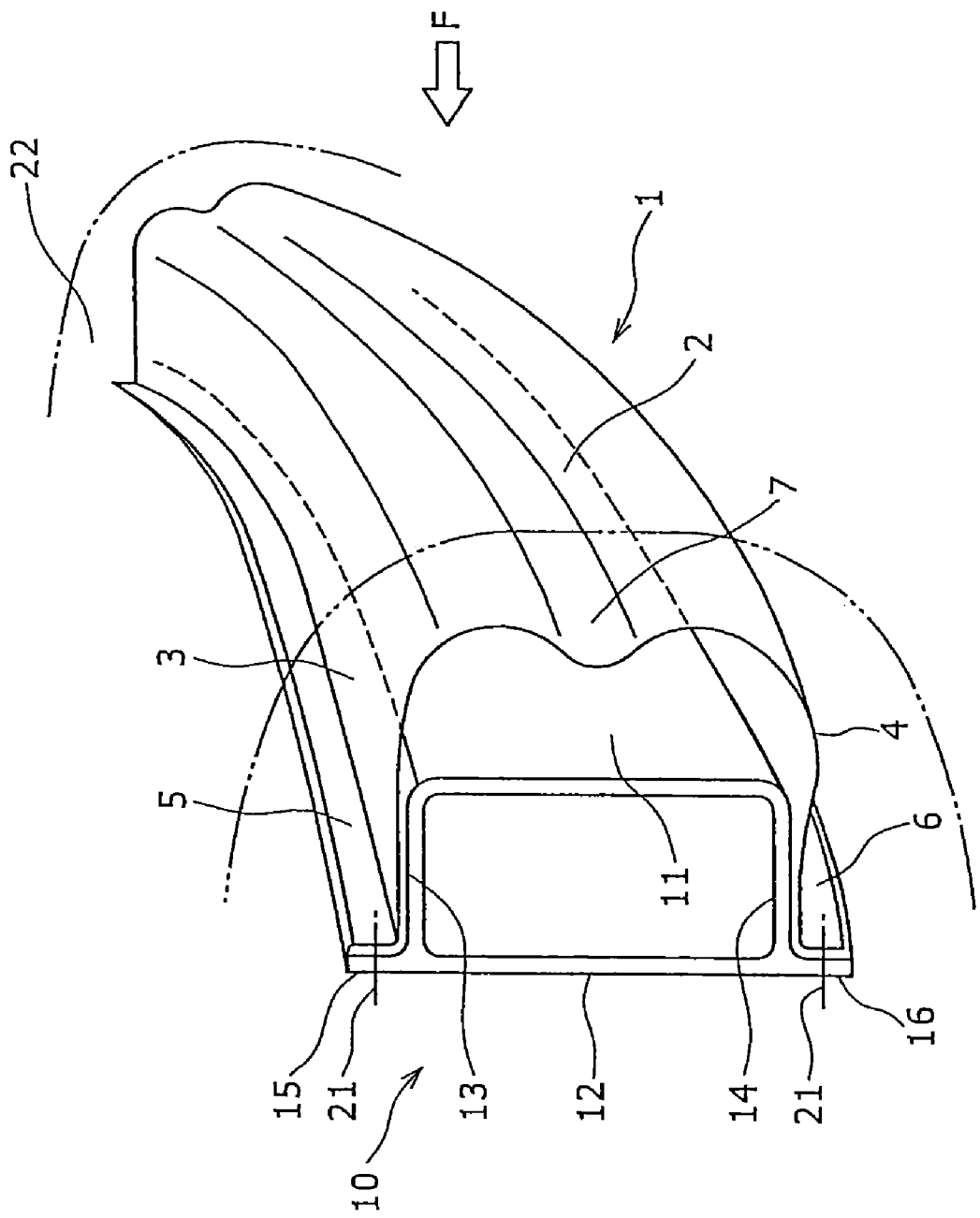
FIG. 2 is an oblique perspective view showing another embodiment of the bumper system for a vehicle in accordance with the present invention.

As a fundamental construction, the impact buffer member 1 made of a metal in accordance with the invention in FIGS. 1, 2 includes a colliding wall part 2 at the front side of the vehicle, the side wall parts of each of the upper and lower side 3 (upper in the drawings), 4 (lower in the drawings), and the joint flanges of each of the upper and lower side 5 (upper in the drawings), 6 (lower in the drawings).

Also, the bumper beam 10 in FIGS. 1, 2 has a hollow (section) construction constituted of the front wall 11 in the front side of the vehicle, the side walls of each of the upper and lower side 13 (upper in the drawing), 14 (lower in the drawings), and the rear wall 12. The rear wall 12 includes two flanges 15 (upper in the drawings), 16 (lower in the drawings) respectively protruding in the up-down direction of the vehicle. At the front face side (the front side: right side in the drawings) of the flanges 15, 16, the flanges 5, 6 of the impact buffer member 1 are respectively joined.

This is one of the embodiments wherein the flanges 5, 6 of the impact buffer member 1 are supported from the rear wall side of the bumper beam. In the bumper beam 10 as illustrated in FIGS. 1, 2, the flanges 15, 16 for supporting the flanges 5, 6 (of the impact buffer member 1) are protruded from the prolongation (on the same plane) of the rear wall 12. However, these flanges 15, 16 may respectively be made to extend in the up-down direction of the vehicle from the upper side wall (web) 13, the lower side wall (web) 14 in the rear wall 12 side of the bumper beam. But in this case, because the length of the side wall parts 3, 4 becomes shorter compared with the support at the prolongation of the rear wall 12 as illustrated in FIGS. 1, 2, the position should be in the front side of the rear wall 12 but in a degree not deteriorating the performance of the impact buffer member by lengthening of the side wall parts 3, 4.

In FIGS. 1, 2, the direction from right to left as illustrated in the arrow F is the loading direction at the time of the vehicle collision and the right side in the drawings shows the front side or the rear side of the bumper beam or the vehicle. Also, what is shown in the single dotted line 22 in the right side of the impact buffer member 1 is the vehicle body panel (bumper cover, hood, trunk and etc.).

In FIGS. 1, 2, although it is not shown, an absorber made of PP foam and the like may be arranged between the impact buffer member 1 and the vehicle body shown in the single dotted line as is conventionally done. Besides, in the vehicle rear side (left side in the drawings) of the bumper beam 10, a stay made of steel or aluminum alloy, a side member made of steel and the like for supporting the bumper beam 10 are arranged in this order. Furthermore, in the invention, the thickness of the absorber can be thinner or the amount thereof can be less than before, and it is also possible not to use the absorber at all.

(Colliding Wall Part)

In FIGS. 1, 2, the colliding wall part 2 of the impact buffer member 1 made of a metal protrudes toward the front side of the bumper beam 10 and extends in the up-down direction of the vehicle (up-down direction in the drawings) over the entire area (entire area in the up-down direction of the vehicle) of the front wall 11 of the bumper beam extending in the up-down direction of the vehicle. The shape of the colliding wall part 2 in the up-down direction of the vehicle is the dome-type shape protrudingly curving toward the front of the bumper beam 10. At the time of the vehicle collision with the pedestrian, the colliding wall part 2 becomes the main part to absorb and buffer the impact of the collision with its entire shape being deformed in the longitudinal direction of the vehicle (the direction of the thickness of the section).

Thus, the colliding wall part 2 enlarges its area for extending over the entire area of the front wall 11 of the bumper beam 10 in the up-down direction of the vehicle (for covering all face of the front wall 11 of the bumper beam in the up-down direction of the vehicle). Consequently, the energy absorbing function can be exerted regardless of the shifting in the up-down direction of the vehicle (vertical direction) of the position of the collision of the pedestrian with respect to the bumper beam 10. Also, the hollow construction itself constituted of the front wall 11 of the bumper beam and the colliding wall part 2 can be enlarged. Accordingly, the impact absorbing and buffering function at the time of the vehicle collision by the deformation of the colliding wall part 2 in the longitudinal direction of the vehicle can be enhanced.

Further, the shape of the colliding wall part 2 can be freely selected as far as the colliding wall part 2 protrudes toward the front side of the bumper beam 10. Namely, as illustrated in FIG. 1, it may be formed in an arc shape without an angle part (without a corner part, or non-angular) against the side walls 3, 4. Also, the corner parts of a large shoulder R may respectively be arranged in the up-down direction of the vehicle to make them the ends of the colliding wall part 2 in the up-down direction of the vehicle, and they may be the points of intersection with the side walls 3, 4. But when angle parts (corner parts) are present, they are liable to become the starting points of the breakage, therefore, it is preferable to adopt a big shoulder R or to make them in an arc shape and to eliminate the corner parts as illustrated in FIG. 1. If there are corner parts, they become ends of the colliding wall part 2 in the up-down direction of the vehicle as referred to in the invention. However, each end of the colliding wall part 2 in the up-down direction of the vehicle becomes a suitable point of intersection with the approximately horizontal side wall parts 3, 4.

In the invention, although the colliding wall part 2 is extended over the entire area of the front wall 11 of the bumper beam 10 in the up-down direction of the vehicle, it is not necessary to make it extend, in the longitudinal direction (vehicle width direction), over all the area (entire area) in the longitudinal direction (vehicle width direction) of the front wall 11. The example of the impact buffer member 1 made of a metal of the invention of the FIGS. 1, 2 exemplarily exhibits the case as a typical construction, wherein a single impact buffer member 1 is extended over all the area (entire area) of the bumper beam 10 in the longitudinal direction (vehicle width direction).

Alternatively, the impact buffer member 1 or the colliding wall part 2 may be arranged in a plurality of parts or extend for only a required part or only a required length of the front face of the front wall 11 of the bumper beam 10 in the longitudinal direction (vehicle width direction). Also, the colliding wall part 2 may be partly cut off for only an unnecessary part (unnecessary portion) in the front face of the front wall 11 of the bumper beam 10 in the longitudinal direction (vehicle width direction).

In such a case wherein the impact buffer member 1 or the colliding wall part 2 is arranged partly or divided, the parts of both ends of the bumper beam 10 of a comparatively rigid body which, particularly, supports the bumper beam 10 by stays or the like from the rear side must protect the leg part of the pedestrian, and the impact buffer members 1 are essentially arranged respectively.

On the other hand, in the center part of the bumper beam 10 in the longitudinal direction (vehicle width direction), the impact buffer member 1 may not partly be arranged but only an absorber may be arranged instead. Thus, when the impact buffer member 1 or the colliding wall part 2 is arranged partly or in divided for the required portion only or for the required length only of the front face of the front wall 11 of the bumper beam 10 in the longitudinal direction, the weight of the impact buffer member can be decreased.

(Side Wall Parts)

The side wall parts 3 (upper in the drawings), 4 (lower in the drawings) of each of the up-down side of the impact buffer member 1 elongate respectively from each end of the colliding wall part 2 in the up-down direction of the vehicle toward the rear side of the vehicle along the outside of the side walls 13, 14 of the bumper beam 10 extending in the longitudinal direction of the vehicle, and extend to reach the rear wall 12 of the bumper beam. As a result, the side wall parts 3, 4 and the colliding wall part 2 form a sectional shape of approximate U-shape surrounding the bumper beam 10.

Thus, in the invention, the stroke (length) of both of the side wall parts 3, 4 of the impact buffer member 1 becomes the total of the extruding length of the colliding wall part 2 to the direction of the vehicle front (the length from the front wall 11 of the bumper beam to the colliding wall part 2), and further, the length of the side walls 13, 14 of the bumper beam 10 extending in the longitudinal direction of the vehicle. As such, the stroke (length) of both of the side wall parts 3, 4 of the impact buffer member 1 becomes comparatively big. On the contrary, in the case the flanges 5, 6 of the impact buffer member 1 are supported by the front wall 11 or the side walls 13, 14 of the bumper beam 10 (are protruded from the front wall or a part of the side walls of the bumper beam), the stroke of both of the side wall parts of the impact buffer member has to become considerably shorter than that of both of the side wall parts 3, 4 of the impact buffer member 1 of the present invention.

That means, even if the colliding wall part 2 is not protruded much from the front wall 11 of the bumper beam to the front side of the vehicle and lines the front wall 11 of the bumper beam, the stroke of both of the side wall parts 3, 4 is constantly secured at least for the length of the side walls 13, 14 of the bumper beam. Therefore, in the present invention, the length of the deformation in the longitudinal direction of the vehicle (direction of the thickness of the section) of both of the side wall parts 3, 4 by the impact at the time of vehicle collision becomes long, the steep rise of the load in the load-displacement relation (curve) is decreased, and the buffering characteristics (pedestrian protecting characteristics) at the time of the collision can be improved. Also, a harmful influence is not exerted on the characteristics in the bumper beam 10 side such as strength.

(Flange)

In FIGS. 1, 2, the flanges 5, 6, which are the attaching wall parts of the impact buffer member 1, are elongated in the up-down direction of the vehicle from the ends of the side wall parts 3, 4 to the rear side of the vehicle along the flanges 15 (upper in the drawings), 16 (lower in the drawings) which are a part of the rear wall 12 of the bumper beam, and abut the front face side (the face in the right side in the drawings) of each flanges 15, 16. And in the flanges 15, 16, the flanges 5, 6 of the impact buffer member 1 are respectively joined by a mechanical joining means 21 or the like. As illustrated in FIGS. 1, 2, this joining is performed over the longitudinal direction (vehicle width direction) of the flanges 15, 16 of the bumper beam 10 and the flanges 5, 6 of the impact buffer member 1 with suitable spacing.

If the joining of the impact buffer member 1 and the bumper beam 10 is the joining of the flanges to each other as described above, the generally used mechanical joining means 21 such as bolts or rivets or the generally used welding joining means such as the spot welding becomes applicable to increase the number of choices for joining and to simplify the joining itself.

Further, as described above, the impact buffer member 1 is supported by the rear wall 12 side of the bumper beam 10. With this configuration, the supporting and joining force of the impact buffer member 1 against the bumper beam 10 is freely controllable partly or entirely over the longitudinal direction of the impact buffer member 1 by the synergetic effect of the joining of the flanges to each other as described above. For example, if the supporting or joining force of the impact buffer member 1 is made to be comparatively strong (supporting strength), the supporting face of the impact buffer member becomes a wide face of the rear wall of the bumper beam and breakage of the joining part and the like never occurs easily when the load of the collision is applied even if the joining part is partial. Consequently, the displacement of the hollow construction in the direction of the thickness of the section enough to secure the energy absorption amount required for pedestrian protection can be secured. On the other hand, in case the joining strength is comparatively weak, it can be realized by enlarging the space of the bolts or the spot welding, thereby enabling to inhibit the reaction force or the acceleration of the generally used welding joining means generated at the time of collision.

In the JP-A-2003-285704, the attaching wall part of the impact buffer member is joined to the upper and lower wall face of the bumper beam. However, if the attaching wall part of the impact buffer member is joined to the upper and lower wall face of the bumper beam, and if the bumper beam is of closed section, joining (connection) can be performed from only one side of the attaching wall part of the impact buffer member. In this one-side joining method, the impact buffer member has to be joined either by welding, blind riveting with the preparation hole drilled beforehand, or the like. Here, when welding is applied, in the case the bumper beam is of aluminum alloy, the strength is deteriorated partially by the heat effect at the time of welding. In the case blind riveting is applied, excessive work of drilling the preparation hole is required and the joining strength is weakened. As such, the force for supporting the attaching wall part of the impact buffer member is weakened and the partial breakage of the joining part is liable to occur when the load of a collision is applied. Consequently, the deformation in the direction of the thickness of the section for securing the energy absorption amount required for pedestrian protection can never be secured easily. JP-A-2003-285704 is same as the present invention with regards to the colliding wall part and the attaching wall part being integrally formed by a metal thin plate and that the impact of the vehicle collision is buffered by making the front face of the bumper beam and the colliding wall part constitute a hollow construction and by making the colliding wall part deform in the direction of the thickness of the section at the time of the vehicle collision. However, because the impact buffer member is attached to the upper and lower wall faces of the bumper beam, there are problems of the one-side joining as described above or that the stroke of the side wall parts of the impact buffer member is comparatively short and the compressive deformation length of the impact buffer member is shortened as previously described. As a result, there arise such defects that the initial load in load displacement becomes high and the buffering characteristic (pedestrian protection characteristic) is deteriorated.

(Flange Joining Method)

The manner of joining of the flanges 5, 6 of the impact buffer member with the flanges 15, 16 of the bumper beam may be a mechanical joining 21 such as rivets and bolts. Alternately or in combination with it, welding may be applied. Further, the joining positions are free as far as the joining strength can be secured and are arranged with suitable spaces apart over the longitudinal direction (vehicle width direction) of the bumper beam 10 (the flanges 15, 16) and the impact buffer member 1 (the flanges 5, 6). Also, by changing the joining positions or the joining spaces, the joining strength (supporting strength) of the impact buffer member can be changed. For example, in the portion where the strong joining strength is required, the joining strength (bonding force) can be strengthened by selecting a joining method with high bonding force or by narrowing the joining pitches. On the contrary, when it is desired to inhibit the reaction force or the acceleration generated at the time of the collision, the joining strength (bonding force) can be weakened by selecting a joining method with low bonding force or by enlarging the joining pitches.

(Thin Plate Integral Forming)

The colliding wall part 2, the side wall parts 3, 4, the joint flanges 5, 6 of the impact buffer member 1 are integrally formed of a metallic material of the thickness of 3.0 mm or less. That means the colliding wall part 2, side wall parts 3, 4 and joint flanges 5, 6 are integrally formed of a metallic material of 3.0 mm or less, such as with a sheet of aluminum alloy plate. With this configuration, manufacturing of the impact buffer member becomes easy compared with one unified by joining divided members. Furthermore, the breakage of respective joining part by the impact at the time of the vehicle collision is eliminated and the energy absorbing function at the time of the collision can be enhanced. As a matter of course, the thickness of the colliding wall part 2, the side wall parts 3, 4, the joint flanges 5, 6 may be either equal (same) or not equal (differentiated) with response to the required characteristics. In this case, at least the thickness of the colliding wall part 2 should be 3.0 mm or less, or more preferably, 2.0 mm or less.

With regard to the metallic material, a metal thin plate with a plate thickness (thickness) of 3.0 mm or less is preferable. For the aluminum alloy material, an aluminum alloy thin plate with a thickness of 3.0 mm or less is exemplarily exhibited. Also, with regard to the steel material of high strength, a thin steel plate with a plate thickness of 1.5 mm or less is preferable. The impact buffer member 1 is preferably formed integrally of the colliding wall part 2, the side wall parts 3, 4, the joint flanges 5, 6 by press forming of these thin plates.

Unless the plate thickness is small (unless the thickness is thin), the load at which the deformation in the direction of the thickness of the section for securing the energy absorption required for the pedestrian protection, triggered by a collision with a pedestrian, becomes high, and the function as an impact buffer member cannot be exerted. Also, if the thickness exceeds 3.0 mm, and in the case it is used for the big (wide) area over the entire front face of the bumper beam as described above, even if an aluminum alloy thin plate is used, the weight is increased and lightening becomes difficult. Further, with respect to the aluminum alloy material constituting the impact buffer member, the colliding wall part 2 and the attaching wall parts 3, 4 may be integrally formed as an aluminum alloy extruded hollow shape, if extrusion of the aluminum alloy of the plate thickness (wall thickness) of 3.0 mm or less is possible, in addition to the thin plate such as the rolled plate.

Furthermore, in the case these colliding wall part 2, side wall parts 3, 4, joint flanges 5, 6 are not integral but are unified by joining each member, there inevitably exist dividing or joining parts. Consequently, breakage becomes liable to occur at these dividing parts or joining parts, the deformation in the direction of the thickness of the section for securing the energy absorption amount required for the pedestrian protection becomes difficult to be generated as well, and the function as an impact buffer member cannot be exerted. As a result, the process or the cost of manufacturing the impact buffer member is increased.

(Deformation Part)

So that the deformation of the colliding wall part 2 in the direction of the thickness of the section triggered by the application of the collision load at the time of the collision with a pedestrian occurs easily, it is preferable, as is illustrated in FIG. 2, to comprise a deformation part 7 which is a recess (sunken part) to become an initiating point of the deformation in the center part in the up-down direction of the colliding wall part 2. For exerting the effect to make the deformation in the direction of the thickness of the section occur easily regardless of the colliding position of the pedestrian, the deformation part 7 of the recess is arranged to extend over the vehicle width direction (longitudinal direction) of the colliding wall part 2. Therefore, the impact buffer member 1 of FIG. 2 provided with the deformation part 7 has, so to say, a double-mountain type section hollow shape deriving from the recess 7, compared to the dome type impact buffer member of FIG. 1 without such deformation part 7. In the meantime, the recess is retreating or sunken against the load direction F.

As will be endorsed in the example mentioned later, in this double-mountain type impact buffer member of FIG. 2 with the deformation part 7 for making the deformation in the direction of the thickness of the section (cross-sectional deformation) occur easily, the maximum acceleration (the maximum load) is smaller and the energy absorption amount is comparatively larger, compared to the dome type impact buffer member of FIG. 1 without the deformation part 7, if other conditions remain unchanged. For exerting the effect to make the deformation in the direction of the thickness of the section occur easily, the deformation part 5 may not necessarily be a recess as described above but may possibly be a notch part or a part with a thinner thickness than other parts. However, a recess is preferable because it can easily be integrally formed when the impact buffer member is press-formed from an original plate, and further, the deformation promotion effect mentioned above can be exerted easily.

(Shape of Entire Impact Buffer Member Over Longitudinal Direction)

In FIGS. 1, 2, the bumper beam 10 is not straight but has a shape that both ends retreat and curve in the longitudinal direction of the vehicle and the entire beam curves over its longitudinal direction toward the longitudinal direction of the vehicle because of the designing of the vehicle body. Consequently, the impact buffer member 1 has a shape that both ends retreat and curve in the longitudinal direction of the vehicle and the entire buffer member curves over its longitudinal direction toward the longitudinal direction of the vehicle, matching this curved shape of the bumper beam 10. Thus, the shape of the entire impact buffer member 1 over the longitudinal direction should be one adapted to the shape of the entire bumper beam 10 in the longitudinal direction, for example, straight, if the shape of the bumper beam 10 in the vehicle width direction is straight.

(Another Embodiment of the Impact Buffer Member)

As another embodiment of the impact buffer member, either one or both of the joint flanges 5, 6 of the impact buffer member 1 may line over and join the back face (the face of left side in the drawings) side of the flanges 15, 16 of the bumper beam 10. In such a case, the length in the up-down direction of the vehicle of the colliding wall part 2 of the impact buffer member 1 and the space in the up-down direction of the vehicle between the side wall parts 3, 4 are made longer than the length (height) in the up-down direction of the vehicle of the bumper beam 10 including the flanges 15, 16 of the bumper beam 10 to secure the linearity of the extension of the side wall parts 3, 4 toward the rear side of the vehicle. However, the supporting force of the impact buffer member 1 is decreased compared with the case of FIGS. 1, 2 described previously.

(Material of the Impact Buffer Member)

The material of the impact buffer member with the plate thickness of 3.0 mm or less may be an ordinary steel plate or a high tensile steel plate, but an aluminum alloy is preferable as it is light in weight and has big energy absorbing effect even if it is used for the wide area over the entire front face of the bumper beam as described previously. With respect to the kind of the aluminum alloy, generally used (standardized) aluminum alloy of a 3,000 series as referred to in AA or JIS Standards generally used for the use of the construction member of this kind as a thin plate or an extruded shape, a 5,000 series, 6,000 series with excellent formability and comparatively high yield strength and the like (O, T4, T5, T6, T7 and etc. with the tempering or heat treatment to meet the required performance) are usually used suitably and selectively.

(Bumper Beam)

The bumper beam 10 illustrated in FIGS. 1, 2 includes a rectangular closed section hollow part including the front wall 11, the rear wall 12, the upper side wall 13, the lower side wall 14 which connect the front wall 11 and the rear wall 12 and are arranged approximately horizontally and approximately in parallel. It also includes two flanges 15 (upper), 16 (lower) respectively protruding from the rear wall 12 of the bumper beam in the up-down direction of the vehicle. The configuration of joining the attaching wall parts 3 (upper), 4 (lower) of the impact buffer member 1 to the flanges 15, 16 is easier in joining and is more effective compared to the case wherein there are no flanges 15, 16 and the front wall 11 joins the attaching wall parts 3, 4 directly. However, with respect to the embodiment for supporting the flanges 5, 6 of the impact buffer member 1 from the rear wall side of the bumper beam, these flanges 15, 16 may not necessarily be protruded from the prolongation (on the same plane) of the rear wall 12 as illustrated in FIGS. 1, 2. For example, another embodiment may be possible wherein these flanges 15, 16 respectively protrude in the up-down direction of the vehicle from the upper side wall 13, the lower side wall 14 in the rear wall 12 side of the bumper beam but in the front side of the rear wall 12 in the longitudinal direction of the vehicle thereby supporting the flanges 5, 6 of the impact buffer member 1 from the rear wall side of the bumper beam.

(Other Embodiments of Bumper Beam)

As an embodiment wherein the deformation strength of the hollow part of the bumper beam 10 illustrated in FIGS. 1, 2 in the direction of the thickness of the section (longitudinal direction of the vehicle: lateral direction) is reinforced, a middle rib (ribs) may be arranged. For example, the rectangular closed section hollow part of the bumper beam 10 of FIGS. 1, 2 may be with a section wherein a single middle rib is arranged in the lateral direction, or alternatively, with a section wherein two middle ribs are arranged in parallel in the lateral direction. Also, the rectangular closed section hollow part of the bumper beam 10 of FIGS. 1, 2 may be with a section wherein middle ribs of +shape or X shape are arranged. In addition, in combination with or without the combination with these middle ribs, the corner R of the connecting part (corner part) of the upper and lower side walls 13, 14 and the rear wall 12 of the bumper beam 10 may be enlarged to improve the deformation strength of the hollow part in the direction of the thickness of the section.

In these examples including the bumper beam 10 of the FIGS. 1, 2 described above, the embodiment wherein the material of the bumper beam is an aluminum alloy, particularly an aluminum alloy hollow extruded shape from the viewpoint of easiness of forming hollow section shape over the longitudinal direction, is intended. The bumper beam 10 may be of a high tensile steel plate, but an aluminum alloy is preferable which is lighter in weight and has big energy absorbing effect by plate thickness effect although it is a metal thin plate. Generally used (standardized) aluminum alloy hollow extruded shape of a 3,000 series as referred to in AA or JIS Standards generally used for the use of the construction member of this kind, a 5,000 series, 6,000 series, 7,000 series with excellent formability and comparatively high yield strength and the like (O, T4, T5, T6, T7 and etc. with tempering or heat treatment to meet the required performance) are usually used suitably and selectively.

Although preferred embodiments were exhibited as above, the shape in the direction of the thickness of the section (of cross-section) of the bumper beam side and the material such as of steel make or of aluminum alloy make are determined mainly by the reasons in the vehicle designing side. Therefore, the present invention is applicable to a variety of bumper beams of a variety of shapes in the direction of the thickness of the section (of cross-section), shapes in the longitudinal direction, materials or the like determined in the vehicle designing side, aside from the preferred embodiments described above.

EXAMPLE

The bumper systems of the present invention described above as illustrated in FIGS. 1, 2 were analytically modeled and acceleration-displacement relations by a static collapsing analysis at the time of loading assuming the collision with the pedestrian were obtained with an analysis using the generalized finite element analysis software ABAQUS. In the analytic model of the example of the invention, an absorber was not provided. However, as an embodiment of usage according to the present invention, an absorber composed of PP foam or the like may be arranged (an absorber may be combined with) in the front side of the impact buffer member 1. Also, as is illustrated in FIG. 3, it may be combined with a separate means 20 or the like arranged under the bumper system for kicking up the lower part of the leg in the reverse direction of the direction of the collision by the force F1 shown in the arrow at the time of the collision and preventing excessive bending (big bending angle) of the leg part.

Figure 3:
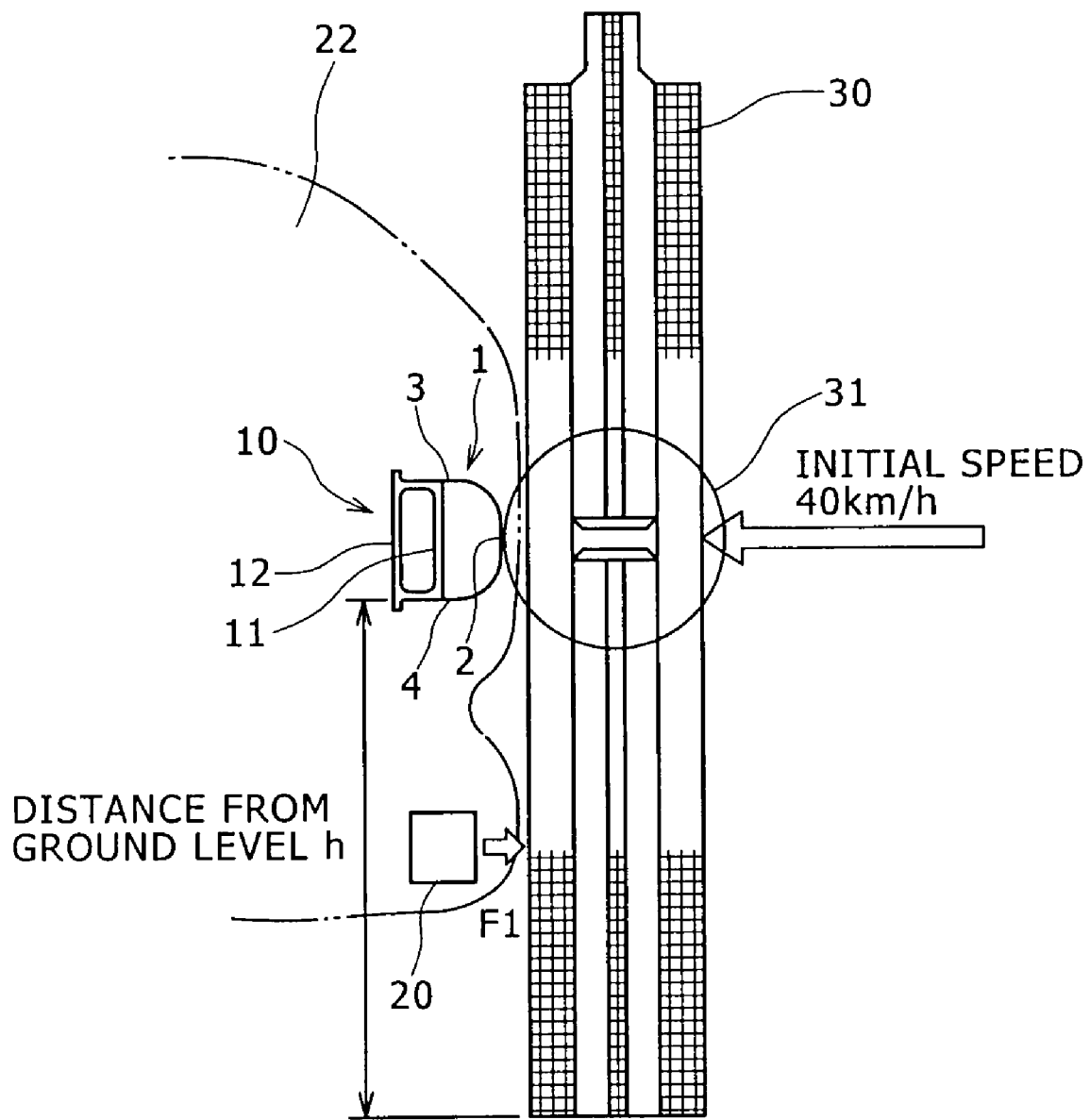
FIG. 3 is an explanatory drawing showing the embodiment of the characteristic analysis of the bumper system for a vehicle in accordance with the present invention.

FIG. 3 illustrates the analytic model described above. In FIG. 3, 10 is the bumper beam, 11 is the bumper beam of FIG. 1, 11, 12 are the front wall, the rear wall of the bumper beam, 1 is the impact buffer member, and 2, 3, 4 are the colliding wall part, the side wall parts of the impact buffer member. Further, 22 is the vehicle body panel, 30 is the leg impactor model imitating the leg part of the pedestrian in accordance with the New Car Assessment Program of the European Enhanced Vehicle-safety Committee, and 31 is the knee (joint) part.

In FIG. 3, the striking position (height) h of the bumper beam 10 shows the height (mm) above the ground level and is fixed at 340.0 mm in accordance with the New Car Assessment Program of the European Enhanced Vehicle-safety Committee. Further, it is assumed that the leg part of the pedestrian collides at the position shifted from the center part in the longitudinal direction of the bumper beam 10 by 100 mm or 300 mm in the longitudinal direction (vehicle width direction). It is shown as the striking position in TABLE 1.

TABLE 1

| | | CONDITION OF IMPACT BUFFER MEMBER 1 | | | PEDESTRIAN PROTECTION CHARACTERISTICS OF BUMPER SYSTEM | | | | |
|---|---|---|---|---|---|---|---|---|---|
| CLASSIFICATION | NUMBER | STRIKING POSITION (mm) | PLATE THICKNESS (mm) | SHAPE | MAXIMUM LOAD (kgf) | EA AMOUNT (kgfmm) | ACCELERATION (G) | BENT ANGLE OF KNEE (degree) | SHEAR DISPLACEMENT OF KNEE (mm) |
| EXAMPLE | 1 | 100 | 0.8 | FIG. 1 | 1153 | 53315 | 124.5 | 10.9 | 3.84 |
| | 2 | 300 | 0.8 | FIG. 1 | 1404 | 52480 | 170.0 | 11.8 | 3.47 |
| | 3 | 100 | 1.0 | FIG. 1 | 1230 | 49795 | 137.2 | 13.0 | 4.42 |
| | 4 | 300 | 1.0 | FIG. 1 | 1198 | 50213 | 126.6 | 12.7 | 4.04 |
| | 5 | 100 | 1.0 | FIG. 2 | 1180 | 48903 | 125.8 | 12.8 | 4.19 |
| | 6 | 300 | 1.0 | FIG. 2 | 1062 | 49191 | 119.7 | 12.3 | 3.83 |

TABLE 1-continued

| | | CONDITION OF IMPACT BUFFER MEMBER 1 | | | PEDESTRIAN PROTECTION CHARACTERISTICS OF BUMPER SYSTEM | | | | |
|---|---|---|---|---|---|---|---|---|---|
| CLASSIFICATION | NUMBER | STRIKING POSITION (mm) | PLATE THICKNESS (mm) | SHAPE | MAXIMUM LOAD (kgf) | EA AMOUNT (kgfmm) | ACCELER- ATION (G) | BENT ANGLE OF KNEE (degree) | SHEAR DISPLACEMENT OF KNEE (mm) |
| COMPARATIVE EXAMPLE | 7 | 100 | — | — | 1311 | 49519 | 154.8 | 11.2 | 5.21 |
| | 8 | 300 | — | — | 1611 | 49712 | 186.8 | 18.9 | 6.19 |

In this analysis, the load (acceleration) the leg part impactor receives, the bent angle of the knee (in the direction of the collision), and the shear displacement of the knee (in the direction of the collision) at the time the leg part impactor imitating the leg part of the pedestrian collides at 40 km/h (initial speed) were analytically assessed in accordance with the assessment program of the European Enhanced Vehicle-safety Committee. The assessment was carried out in accordance with the criteria of the European Enhanced Vehicle-safety Committee, and 150 G or less for the load (acceleration) the leg part impactor 30 receives, 15.0° or less for the bent angle of the knee, and 5.0 or less for the shear displacement of the knee were used as the criteria for passing. TABLE 1 shows these results.

For comparison, the previously discussed bumper beams of the reference examples (conventional examples) 7, 8 were similarly analyzed wherein the impact buffer material was not provided and only an absorber with 40 mm thickness made of PP foam that had the expansion ratio of 11 times and was most hard among those generally used was provided in the front side of the bumper beam 10 illustrated in FIG. 1.

Following conditions were defined as the common analysis conditions for both of the examples of the invention and the conventional examples. As is illustrated in FIG. 1, the force of the load is to be applied to the center part in front of each bumper beam 10 (of each impact buffer member 1) as the arrow F. The impact buffer member 1 is of a press formed product of two kinds of plate of 0.8 mm and 1.2 mm plate thickness of JIS6022 aluminum alloy plate H tempered material.

The outer sizes of the impact buffer members 1, press formed products, are commonly 1,400 mm in the length (vehicle width direction), same with that of the bumper beams 10, 90 mm in the maximum height (up-down direction of the vehicle) of the colliding wall part 2, 50 mm in the maximum protruding length (the protruding length from the front wall 11 of the bumper beam in the longitudinal direction of the vehicle) of the colliding wall part 2, 95 mm in each length of the side wall parts 3, 4 (the length from the flanges 5, 6 to the colliding wall part 2 in the longitudinal direction of the vehicle). The length of the flanges 5, 6 is 15 mm in the up-down direction of the vehicle. Also, in case there is a recess 7 over the entire length of the impact buffer member 1, the width of the recess 7 (up-down direction of the vehicle) is 70 mm and the depth (longitudinal direction of the vehicle) is 10 mm.

Further, the bumper beams 10 are of 7,000 series aluminum alloy extrusion shape T5 tempered material with the wall thickness of 3.0 mm. Outer sizes commonly are 1,300 mm in the length (vehicle width direction), 87 mm in the height (up-down direction of the vehicle) of the front wall 11, the rear wall 12, 2.3 mm in the thickness of the front wall 11, 2.0 mm in the thickness of the front wall 11, the rear wall 12, 2.3 mm in the thickness of the front wall 11, 2.0 mm in the thickness of the rear wall 12, 15 mm in each length (up-down direction of the vehicle) of the flanges 15, 16, 38 mm in the length (longitudinal direction of the vehicle) of each side walls 13, 14 with each thickness of 2.2 mm.

According to the results of TABLE 1, in the examples of the invention 1 to 6 of the types of FIGS. 1, 2, the maximum load is small and the energy absorbing amount (EA) is large even if the striking position of the leg part of the pedestrian is shifted. As a result, the load (acceleration) the leg part impactor receives, the bent angle of the knee (in the direction of the collision), and the shear displacement of the knee (in the direction of the collision) are small and satisfy the criteria of passing of the European Enhanced Vehicle-safety Committee. Thus, it is understood that the damage of the leg part of the pedestrian at the time of the collision is small in the examples in accordance with the invention.

On the contrary, in the previously discussed reference examples (conventional examples) 7, 8 wherein the impact buffer material is not provided and only an absorber made of PP foam is provided in the front side of the bumper beam 10 illustrated in FIG. 1, the load (acceleration) the leg part impactor 30 receives, the bent angle of the knee and the shear displacement of the knee and the like surpass the criteria of passing of the European Enhanced Vehicle-safety Committee. This means, although an absorber is provided, the leg part collides with the front side of the bumper beam 10 in an early stage and the steep rise in the load occurs in an early stage. Therefore, it endorses the fact that the damage of the leg part of the pedestrian at the time of the collision is large if only the conventional absorber is provided.

What is claimed is:

1. A bumper system for a vehicle comprising:
a bumper beam comprising a front wall positioned toward a longitudinal end of a vehicle, side walls extending in the longitudinal direction of the vehicle, and a rear wall having flange parts protruding at both ends of the rear wall, whereby a hollow section is enclosed by the front wall, the side walls and the rear wall; and
an aluminum impact buffer member arranged at a front side of the bumper beam, the impact buffer member comprising a colliding wall part positioned toward the longitudinal end of the vehicle, side wall parts spaced by a first width and extending in the longitudinal direction of the vehicle toward the rear wall from opposite vertical sides of the colliding wall part, wherein said side wall parts are straight along their lengths from their rearward ends to a position in front of the front wall of the bumper beam and wherein the straight side wall parts join with the colliding wall part at arc portions, said arc portions being curved such that the width of said impact buffer member at said arc portions is not greater than said first width, each arc portion having a center of curvature located within the impact buffer member, and joint flanges respectively protruding vertically from the rearward ends of the side wall parts, wherein the colliding wall part, the side wall parts and the joint flanges are integrally formed, wherein the colliding wall part of the impact buffer member extends vertically at the front side of the bumper beam over the entire height of the front wall of the bumper beam, wherein the side wall parts of the impact buffer member respectively extend toward the rear wall along the outside of the side walls of the bumper beam and reach the joint flanges located at the rear wall of the bumper beam, with the side wall parts and the colliding wall part forming a sectional shape surrounding the bumper beam, wherein the joint flanges of the impact buffer member are joined with the flange parts of the rear wall of the bumper beam, and wherein the bumper beam is constituted of a hollow extruded shape of an aluminum alloy.

2. The bumper system as claimed in claim 1, wherein the impact buffer member has a thinner thickness than that of the bumper beam.

3. A bumper system for a vehicle comprising:

a bumper beam comprising a front wall positioned toward a longitudinal end of a vehicle, side walls extending in the longitudinal direction of the vehicle, and a rear wall having flange parts protruding at both ends of the rear wall, whereby a hollow section is enclosed by the front wall, the side walls and the rear wall; and an impact buffer member arranged at a front side of the bumper beam, the impact buffer member comprising a colliding wall part positioned toward the longitudinal end of the vehicle, side wall parts spaced by a first width and extending in the longitudinal direction of the vehicle toward the rear wall from opposite vertical sides of the colliding wall part, wherein said side wall parts are straight along their lengths from their rearward ends to a position in front of the front wall of the bumper beam and wherein the straight side wall parts join with the colliding wall part at arc portions, said arc portions being curved such that the width of said impact buffer member at said arc portions is not greater than said first width, each arc portion having a center of curvature located within the impact buffer member, and joint flanges respectively protruding vertically from the rearward ends of the side wall parts, wherein the colliding wall part, the side wall parts and the joint flanges are integrally formed, wherein the colliding wall part of the impact buffer member extends vertically at the front side of the bumper beam over the entire height of the front wall of the bumper beam, wherein the side wall parts of the impact buffer member respectively extend toward the rear wall along the outside of the side walls of the bumper beam and reach the joint flanges located at the rear wall of the bumper beam, with the side wall parts and the colliding wall part forming a sectional shape surrounding the bumper beam, wherein the joint flanges of the impact buffer member are joined with the flange parts of the rear wall of the bumper beam, and wherein the impact buffer member is an integrally formed article of the colliding wall part, the side wall parts and the joint flanges formed of an aluminum alloy plate.

4. A bumper system for a vehicle comprising:

a bumper beam comprising a front wall positioned toward a longitudinal end of a vehicle, side walls extending in the longitudinal direction of the vehicle, and a rear wall having flange parts protruding at both ends of the rear wall, whereby a hollow section is enclosed by the front wall, the side walls and the rear wall; and an aluminum impact buffer member arranged at a front side of the bumper beam, the impact buffer member comprising a colliding wall part positioned toward the longitudinal end of the vehicle, side wall parts spaced by a first width and extending in the longitudinal direction of the vehicle toward the rear wall from opposite vertical sides of the colliding wall part, wherein said side wall parts are straight along their lengths from their rearward ends to a position in front of the front wall of the bumper beam and wherein the straight side wall parts join with the colliding wall part at arc portions, said arc portions being curved such that the width of said impact buffer member at said arc portions is not greater than said first width, each arc portion having a center of curvature located within the impact buffer member, and joint flanges respectively protruding vertically from the rearward ends of the side wall parts, wherein the colliding wall part, the side wall parts and the joint flanges are integrally formed, wherein the colliding wall part of the impact buffer member extends vertically at the front side of the bumper beam over the entire height of the front wall of the bumper beam, wherein the side wall parts of the impact buffer member respectively extend toward the rear wall along the outside of the side walls of the bumper beam and reach the joint flanges located at the rear wall of the bumper beam, with the side wall parts and the colliding wall part forming a sectional shape surrounding the bumper beam, wherein the joint flanges of the impact buffer member are joined with the flange parts of the rear wall of the bumper beam, and wherein the colliding wall part of the impact buffer member comprises a recess to become the starting point of the deformation at the time of the vehicle collision.

5. The bumper system as claimed in claim 3, wherein the impact buffer member has a thinner thickness than that of the bumper beam.

6. The bumper system as claimed in claim 4, wherein the impact buffer member has a thinner thickness than that of the bumper beam.

* * * * *